(12) United States Patent
Toews et al.

(10) Patent No.: US 10,346,365 B2
(45) Date of Patent: Jul. 9, 2019

(54) STORING TEMPORARY STATE DATA IN SEPARATE CONTAINERS

(71) Applicant: Microsoft Technology Licensing, LLC, Redmond, WA (US)

(72) Inventors: John Hartley Toews, Seattle, WA (US); Jacob Richard Pitts, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 47 days.

(21) Appl. No.: 14/690,663

(22) Filed: Apr. 20, 2015

(65) Prior Publication Data
US 2015/0227548 A1   Aug. 13, 2015

Related U.S. Application Data

(63) Continuation of application No. 12/766,681, filed on Apr. 23, 2010, now Pat. No. 9,015,136, which is a continuation-in-part of application No. 12/692,210, filed on Jan. 22, 2010, now abandoned.

(51) Int. Cl.
G06F 16/176      (2019.01)
G06F 16/958      (2019.01)
G06F 16/951      (2019.01)

(52) U.S. Cl.
CPC ........ *G06F 16/1774* (2019.01); *G06F 16/951* (2019.01); *G06F 16/972* (2019.01)

(58) Field of Classification Search
CPC ......... G06F 17/30171; G06F 17/30864; G06F 17/30893; G06F 16/1774; G06F 16/972; G06F 16/951

USPC ........................................................ 707/704
See application file for complete search history.

(56) References Cited

U.S. PATENT DOCUMENTS

| | | | |
|---|---|---|---|
| 4,821,175 A | 4/1989 | Hikita et al. | |
| 5,606,719 A * | 2/1997 | Nichols | H04L 29/00 709/203 |
| 5,875,296 A * | 2/1999 | Shi | G06F 21/41 726/5 |

(Continued)

FOREIGN PATENT DOCUMENTS

KR    20020018912 A  *  3/2002

OTHER PUBLICATIONS

Rost et al., "The Cyclone Server Architecture: Streamlining Delivery of Popular Content", Computer Communications 25 (2002): pp. 403-412, 2002. (Year: 2002).*

(Continued)

*Primary Examiner* — Phuong Thao Cao

(57) ABSTRACT

A temporary state service protocol is utilized by clients to temporarily store and access data within rows of a database between different requests made by end users. Each client creates and manages one or more items for storing data in rows of the database independently from other clients. An Application Programming Interface (API) is used to create and interact with the data that is temporarily stored in items within rows of the database. Different clients may share data within a single item and the data may persist beyond a session ending. Different rows of the database may be related such that a procedure affecting one of the rows affects its related rows.

20 Claims, 4 Drawing Sheets

(56) References Cited

U.S. PATENT DOCUMENTS

| | | | |
|---|---|---|---|
| 5,961,601 A * | 10/1999 | Iyengar | G06F 9/54 707/E17.119 |
| 5,991,878 A * | 11/1999 | McDonough | G06F 21/6218 707/999.009 |
| 6,065,117 A * | 5/2000 | White | G06Q 20/367 380/255 |
| 6,076,108 A | 6/2000 | Courts et al. | |
| 6,134,592 A * | 10/2000 | Montulli | G06F 17/30899 707/E17.119 |
| 6,138,120 A | 10/2000 | Gongwer et al. | |
| 6,226,752 B1 * | 5/2001 | Gupta | G06F 21/33 726/9 |
| 6,247,145 B1 | 6/2001 | Witteried | |
| 6,330,566 B1 | 12/2001 | Durham | |
| 6,336,135 B1 * | 1/2002 | Niblett | G06F 9/541 707/E17.001 |
| 6,401,125 B1 * | 6/2002 | Makarios | H04L 67/14 709/219 |
| 6,460,071 B1 * | 10/2002 | Hoffman | G06F 9/461 709/203 |
| 6,480,894 B1 | 11/2002 | Courts et al. | |
| 6,557,038 B1 | 4/2003 | Becker et al. | |
| 6,598,060 B2 | 7/2003 | Goldick | |
| 6,687,739 B2 | 2/2004 | Anupam et al. | |
| 6,938,085 B1 * | 8/2005 | Belkin | G06F 9/5055 709/213 |
| 6,985,588 B1 * | 1/2006 | Glick | G06F 21/10 380/258 |
| 6,996,605 B2 | 2/2006 | Low et al. | |
| 7,003,550 B1 | 2/2006 | Cleasby et al. | |
| 7,127,514 B2 * | 10/2006 | Hunt | G06F 9/546 709/227 |
| 7,188,176 B1 | 3/2007 | Nedderman et al. | |
| 7,197,568 B2 * | 3/2007 | Bourne | G06F 17/30902 707/E17.12 |
| 7,254,634 B1 * | 8/2007 | Davis | G06F 11/203 709/227 |
| 7,406,519 B2 | 7/2008 | Goldick | |
| 7,634,570 B2 * | 12/2009 | Paya | G06F 17/30902 709/227 |
| 7,664,781 B2 | 2/2010 | White et al. | |
| 7,729,480 B1 | 6/2010 | Packingham et al. | |
| 7,739,244 B2 * | 6/2010 | Verma | G06F 11/1438 707/684 |
| 7,743,039 B2 | 6/2010 | Jones et al. | |
| 7,788,341 B1 * | 8/2010 | Burns | G06F 17/2247 709/219 |
| 7,801,872 B2 * | 9/2010 | Dussud | G06F 12/0276 707/704 |
| 7,937,453 B1 * | 5/2011 | Hayden | G06F 17/30203 707/607 |
| 8,161,163 B2 * | 4/2012 | Hunt | G06F 9/546 709/203 |
| 8,412,838 B1 * | 4/2013 | Wang | H04L 12/00 709/225 |
| 8,561,088 B2 * | 10/2013 | Kim | G06F 9/465 717/162 |
| 8,566,392 B1 * | 10/2013 | Mitchell | G06F 17/3089 709/203 |
| 8,635,254 B2 | 1/2014 | Harvey et al. | |
| 8,706,685 B1 | 4/2014 | Smith et al. | |
| 9,015,136 B2 | 4/2015 | Toews et al. | |
| 2002/0087624 A1 | 7/2002 | Liebenow | |
| 2002/0087657 A1 * | 7/2002 | Hunt | G06F 9/546 709/217 |
| 2002/0147652 A1 * | 10/2002 | Gheith | G06Q 30/06 705/26.1 |
| 2002/0174194 A1 * | 11/2002 | Mooney | H04L 51/36 709/219 |
| 2003/0088659 A1 * | 5/2003 | Susarla | H04L 29/06 709/223 |
| 2003/0110266 A1 * | 6/2003 | Rollins | H04L 29/06 709/227 |
| 2003/0135587 A1 * | 7/2003 | Fisher | G06F 17/30899 709/219 |
| 2003/0172149 A1 | 9/2003 | Edsall et al. | |
| 2004/0064564 A1 | 4/2004 | Belkin | |
| 2004/0085366 A1 | 5/2004 | Foster et al. | |
| 2004/0133563 A1 | 7/2004 | Harvey et al. | |
| 2004/0181598 A1 * | 9/2004 | Paya | G06F 16/9574 709/227 |
| 2004/0205774 A1 | 10/2004 | Goodwin et al. | |
| 2004/0249900 A1 * | 12/2004 | Karstens | H04L 51/04 709/207 |
| 2004/0255048 A1 | 12/2004 | Lev Ran et al. | |
| 2005/0132382 A1 * | 6/2005 | McGuire | G06F 8/68 719/311 |
| 2005/0204045 A1 * | 9/2005 | Belkin | G06F 9/5027 709/227 |
| 2005/0267772 A1 * | 12/2005 | Nielsen | G06Q 30/0601 709/232 |
| 2005/0267935 A1 | 12/2005 | Gandhi et al. | |
| 2006/0069876 A1 | 3/2006 | Bansal et al. | |
| 2006/0136376 A1 * | 6/2006 | Jain | G06F 17/30171 |
| 2006/0136516 A1 * | 6/2006 | Jain | G06F 17/30171 |
| 2006/0136926 A1 | 6/2006 | Goldick | |
| 2006/0248198 A1 * | 11/2006 | Galchev | G06F 11/1438 709/227 |
| 2006/0277596 A1 * | 12/2006 | Calvert | H04L 63/0218 726/3 |
| 2007/0005555 A1 * | 1/2007 | Jain | G06F 17/30233 |
| 2007/0005604 A1 * | 1/2007 | Jain | G06F 17/30233 |
| 2007/0005779 A1 * | 1/2007 | Yao | H04L 63/0807 709/228 |
| 2007/0033284 A1 | 2/2007 | Gung et al. | |
| 2007/0101406 A1 * | 5/2007 | Zavalkovsky | H04L 63/0815 726/4 |
| 2007/0130167 A1 * | 6/2007 | Day | H04L 29/12594 |
| 2007/0169175 A1 * | 7/2007 | Hall | H04L 63/0807 726/3 |
| 2007/0174576 A1 | 7/2007 | Meiri et al. | |
| 2007/0219980 A1 * | 9/2007 | Songfack | G06F 17/30306 |
| 2007/0250468 A1 | 10/2007 | Pieper | |
| 2007/0283317 A1 * | 12/2007 | Sadler | G06F 9/465 717/103 |
| 2008/0104255 A1 | 5/2008 | Volodarsky et al. | |
| 2008/0104520 A1 * | 5/2008 | Swenson | G06F 17/30899 715/738 |
| 2008/0184128 A1 * | 7/2008 | Swenson | G09G 5/14 715/738 |
| 2008/0195740 A1 * | 8/2008 | Lowell | H04L 29/06 709/229 |
| 2008/0256623 A1 * | 10/2008 | Worley | H04L 63/02 726/14 |
| 2008/0270405 A1 | 10/2008 | White et al. | |
| 2008/0276117 A1 | 11/2008 | Tran et al. | |
| 2009/0025010 A1 | 1/2009 | Foottit et al. | |
| 2009/0092131 A1 * | 4/2009 | Hu | H04L 65/1006 370/356 |
| 2009/0125719 A1 * | 5/2009 | Cochran | G06Q 30/02 713/171 |
| 2009/0228550 A1 * | 9/2009 | Kawachiya | A63F 13/12 709/203 |
| 2009/0252159 A1 | 10/2009 | Lawson et al. | |
| 2010/0005406 A1 | 1/2010 | Hathaway et al. | |
| 2010/0114848 A1 * | 5/2010 | McKelvie | G06F 9/526 707/704 |
| 2010/0185593 A1 * | 7/2010 | Wong | G06F 16/2379 707/684 |
| 2011/0022962 A1 | 1/2011 | Luo et al. | |
| 2011/0040788 A1 * | 2/2011 | March | G06F 17/30132 707/770 |
| 2011/0112690 A1 | 5/2011 | Caron et al. | |
| 2011/0154185 A1 | 6/2011 | Kern et al. | |
| 2011/0184924 A1 * | 7/2011 | Toews | G06F 17/30893 707/704 |
| 2011/0185134 A1 * | 7/2011 | Toews | G06F 16/9574 711/158 |

(56) References Cited

U.S. PATENT DOCUMENTS

| | | | | |
|---|---|---|---|---|
| 2011/0203004 A1* | 8/2011 | Ziering | ............... | G06F 21/10 726/28 |
| 2012/0079365 A1* | 3/2012 | Yoshida | ............ | G06F 17/30902 715/234 |
| 2015/0195156 A1* | 7/2015 | Agrawal | .............. | G06F 16/972 709/224 |

OTHER PUBLICATIONS

Asp 101 "How to Share Session"; accessed http://www.aspIOI/comlarticles/jayramlsharestate/default.asp on Jan. 15, 2010; 5 pgs.

Ban, B.; "A Flexible APIfor State Transfer in JavaGroups Toolkit"; Dept. of Computer Science, Cornell University; accessed Nov. 23, 2009 at http://209.85.229.I32/search?q=cache:NYDMV qP7pcOJ.:www.jgroups.org/papers/state.ps.gz+API+to+support+state+sharing+on+server&cd=6&hl=en&ct=clnk& gl =in&client=firefox; 22 pgs.

Dreibholz, T.; "An Efficient Approach for State Sharing in Server Pools"; University of Essen, Institute for Experimental Mathematics; 27th Annual IEEE Conference on Local Computer Networks; 2002; 2 pgs.

Gabhart, K.; "J2EE pathfinder: Create and manage stateJul Web apps"; IBM; Jul. 30, 2003; http://www.ibm.comldeveloperworks/java/library/j-pj2ee6.html; 5 pgs.

JavaNB; "Servlets and JavaServer Pages: The J2EE Technology Web Tier"; 2006-2007; accessed Nov. 23, 2009 at http://0321136497_ch091evlsec2.html; 3 pgs.

Joshi, B.; "Storing Session State in a SQL Server Database"; Developer.com; Mar. 31, 2006; http://www.developer.com/db/article.php/3595766/storing-session-state-in-a-SQL-server-database.htm; 5 pgs.

Landgrave, T.; "Server-side state management for .NET architects"; Mar. 20, 2003; http://www.builderau.com.aulpro gramlwindowsl soa/Server-side-state-management -for-NET -architects/0,339024644,320273014,00.htm; 3 pgs.

Microsoft Corporation; "Temporary State Service Protocol Specification"; Microsoft Corporation; Nov. 5, 2009; 23 pgs.

MSDN; "16.2.2 ASP.NET State Server Protocol"; 2009; http://msdn.microsoft.comlen-us/library/cc239529.aspx; 1 pg.

Oracle; "Oracle Coherence 3.5: Coherence * Web Session Management Module"; 2009; http://www.oracle.comlproducts/middleware/coherence/docs/coherence-web-datasheet.pdf; 3 pgs.

Parthasarathy, S., et al.; "Shared State for Client-Server Mining"; accessed Nov. 23, 2009 at http://www.siam.org/meetings/sdmOl/pdf/sdmOl_18.pdf; 20 pgs.

Seebach, P.; "The stateless state"; Jul. 22, 2008; http://www.ibm.comldevelioperworks/web/library/wa-state; 15 pgs.

Tomar, N.; "State Management is Silverlight using Isolated Storage"; Jul. 28, 2008; http://www.csharpcomer.comlUploadFile/nipuntomar/SilverlightIsolatedStorage07282008134106PMISilverlightIsolatedStorage.aspx; 5 pgs.

U.S. Appl. No. 12/692,210, Office Action dated Jan. 31, 2013, 21 pgs.

U.S. Appl. No. 12/766,681, Amendment and Response filed Nov. 26, 2012, 15 pages.

U.S. Appl. No. 12/766,681, Amendment and Response filed Jun. 25, 2012, 14 pgs.

U.S. Appl. No. 12/766,681, Office Action dated Feb. 23, 2012, 23 pgs.

U.S. Appl. No. 12/766,681, Office Action dated Aug. 24, 2012, 31 pgs.

Yuan, M.; "Introduction to JBoss Seam"; Dec. 18, 2006; http://www.infoq.comlarticles/jboss-seam; 17 pgs.

U.S. Appl. No. 12/766,681, Office Action dated Dec. 6, 2013, 31 pgs.

U.S. Appl. No. 12/766,681, Amendment and Response filed Mar. 6, 2014, 16 pgs.

U.S. Appl. No. 12/766,681, Office Action dated May 14, 2014, 35 pages.

U.S. Appl. No. 12/766,681, Amendment and Response filed Oct. 14, 2014, 19 pgs.

U.S. Appl. No. 12/766,681, Notice of Allowance dated Dec. 24, 2014, 17 pgs.

\* cited by examiner

STORING TEMPORARY STATE DATA IN SEPARATE CONTAINERS

RELATED APPLICATIONS

The present application is a continuation of U.S. patent application Ser. No. 12/766,681, filed Apr. 23, 2010, now issued U.S. Pat. No. 9,015,136, which is a continuation-in-part of U.S. patent application Ser. No. 12/692,210, filed Jan. 22, 2010, which is incorporated by reference and claims the benefit of the earlier filing date under 35 U.S.C. § 120. To the extent appropriate, a claim of priority is made to each of the above disclosed applications.

BACKGROUND

The HyperText Transport Protocol (HTTP) is a stateless protocol that is used to request and serve web resources, such as web pages, graphics, and the like over the Internet. Each request is serviced as it arrives from a client and after the request is processed the data relating to the request is discarded. As such, no state information is maintained across requests even from the same client. It is useful, however, to maintain information across requests for certain solutions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A temporary state service protocol is utilized by clients to temporarily store and access data within rows of a database between different requests made by end users. Each client creates and manages one or more items for storing data in rows of the database independently from other clients. An Application Programming Interface (API) is used to create and interact with the data that is temporarily stored in items within rows of the database. Different clients may share data within a single item and the data may persist beyond a session ending. Different rows of the database may be related such that a procedure affecting one of the rows affects its related rows.

DETAILED DESCRIPTION

Figure 1:
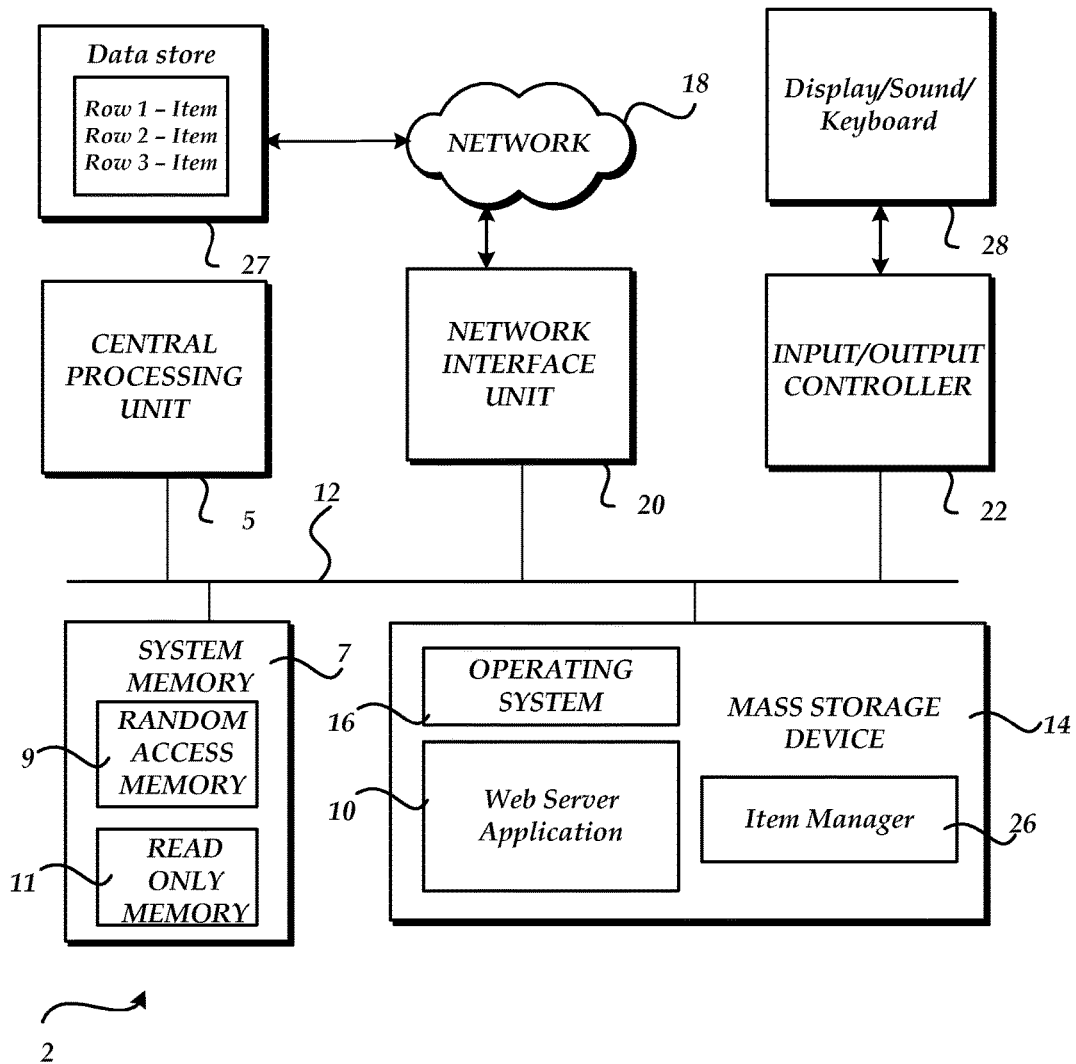
FIG. 1 illustrates an exemplary computing environment.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an exemplary computer architecture for a computer 2 utilized in various embodiments will be described. The computer architecture shown in FIG. 1 may be configured in many different ways. For example, the computer may be configured as a web server, a personal computer, a mobile computer and the like. As shown, computer 2 includes a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, the computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments, the computer 2 operates in a networked environment using logical connections to remote computers through a network 18, such as the Internet. The computer 2 may connect to the network 18 through a network interface unit 20 connected to the bus 12. The network interface unit 20 may also be utilized to connect to other types of networks and remote computer systems.

The computer 2 may also include an input/output controller 22 for receiving and processing input from a number of devices, such as: a keyboard, mouse, electronic stylus and the like (28). Similarly, the input/output controller 22 may provide output to a display screen, a printer, or some other type of device (28).

As mentioned briefly above, a number of program modules and data files may be stored in the mass storage device 14 and RAM 9 of the computer 2, including an operating system 16 suitable for controlling the operation of a networked computer, such as: the WINDOWS 7®, WINDOWS SERVER®, WINDOWS SHAREPOINT SERVER®, operating systems from MICROSOFT CORPORATION; UNIX; LINUX and the like. The mass storage device 14 and RAM 9 may also store one or more program modules. In particular, the mass storage device 14 and the RAM 9 may store a web server application program 10. According to one embodiment, the web server application 10 is a content management application, such as MICROSOFT CORPORATION'S SHAREPOINT 2010®. The web server application program 10 is operative to provide functionality for receiving requests from clients and processing the requests.

Typically, web server application 10 receives a request from a end user's browser application on a client computing device. A WWW browser, such as Microsoft's INTERNET EXPLORER®, is a software browser application program that may be used in requesting the data. Upon receiving the request from the user via the browser on a separate computing device, the web server application 10 retrieves the desired data from the appropriate data server. Generally, a request occurs over HTTP and includes one or more identifiers (ID) for one or more clients. HTTP is a higher-level protocol than TCP/IP and is designed for the requirements of the Web and is used to carry requests from a browser to a Web server and to transport pages from Web servers back to the requesting browser or client. Item manager 26 is used to temporarily store data in a location within a database, such as data store 27, between requests such that data needed by a client is not lost between requests. Data store 27 is configured to store data within items for a number of clients. According to one embodiment, each item is stored within a separate row of a database. Each client manages its own items within the rows of data store 27 independently from the other clients.

Generally, item manager 26 uses a temporary state service protocol that provides an API to clients to create, store and interact with data that is temporarily stored within items in data store 27. Instead of each client that is associated with a web page having to share and store data within a single item for the web page, each client that is associated with the web page can store data in one or more different items within the rows of the database in data store that are each maintained separately. For example, a first client can store data in a first item within a first row (i.e. Row 1), whereas a second client that is associated with the same page can store data in a second item within a second row (i.e. Row 2). Different clients may also interact with data in different rows when they are provided with the unique identifier for the item that is stored in a different row. For example, a first client may provide the second client with the identifier of the first row such that the second client can perform actions on the data within the first row that was created by the first client. Each client can create items that are uniquely identified for storing data. When the clients retrieve items from the data store, clients can optionally request that a virtual lock be placed on the item to ensure exclusive access for the requesting client. The procedures associated with the protocol are directed at enabling clients to create, add, modify, retrieve, and delete items in a data store, such as data store 27. According to one embodiment, procedures are directed at enabling clients to access items with virtual locks and to remove virtual locks from instances of the item. Generally, when a client intends to modify data in an item, the client requests exclusive access to the item by requesting a lock on the item. The client receives an indication, such as a lock cookie identifying that a virtual lock is placed on the item. Once a client has completed working with an item of the data, the client can store the updated item in the data store and release the virtual lock identified by the lock cookie, thereby allowing other clients to access the item. If no changes were made to an item of the data, clients can release the virtual lock without making any modifications to the item in the data store. In some instances, a virtual lock held on an item will be considered stale after a period of time. In these situations, a client can forcibly remove the virtual lock from the item and/or the lock can be automatically removed. According to one embodiment, items within each row of the database within the data store are set to expire after a predetermined amount of time. For example, clients may set the expiration time and/or some other authorized user may set the expiration time. Using the API, clients can modify the expiration time for an item of the data in the data store without modifying the data itself. Clients can also remove an item of the data or all items of expired data from the data store. Additional details regarding the operation of the item manager 26 and the temporary state service protocol used to interact with the data within the rows of the database will be provided below.

Figure 2:
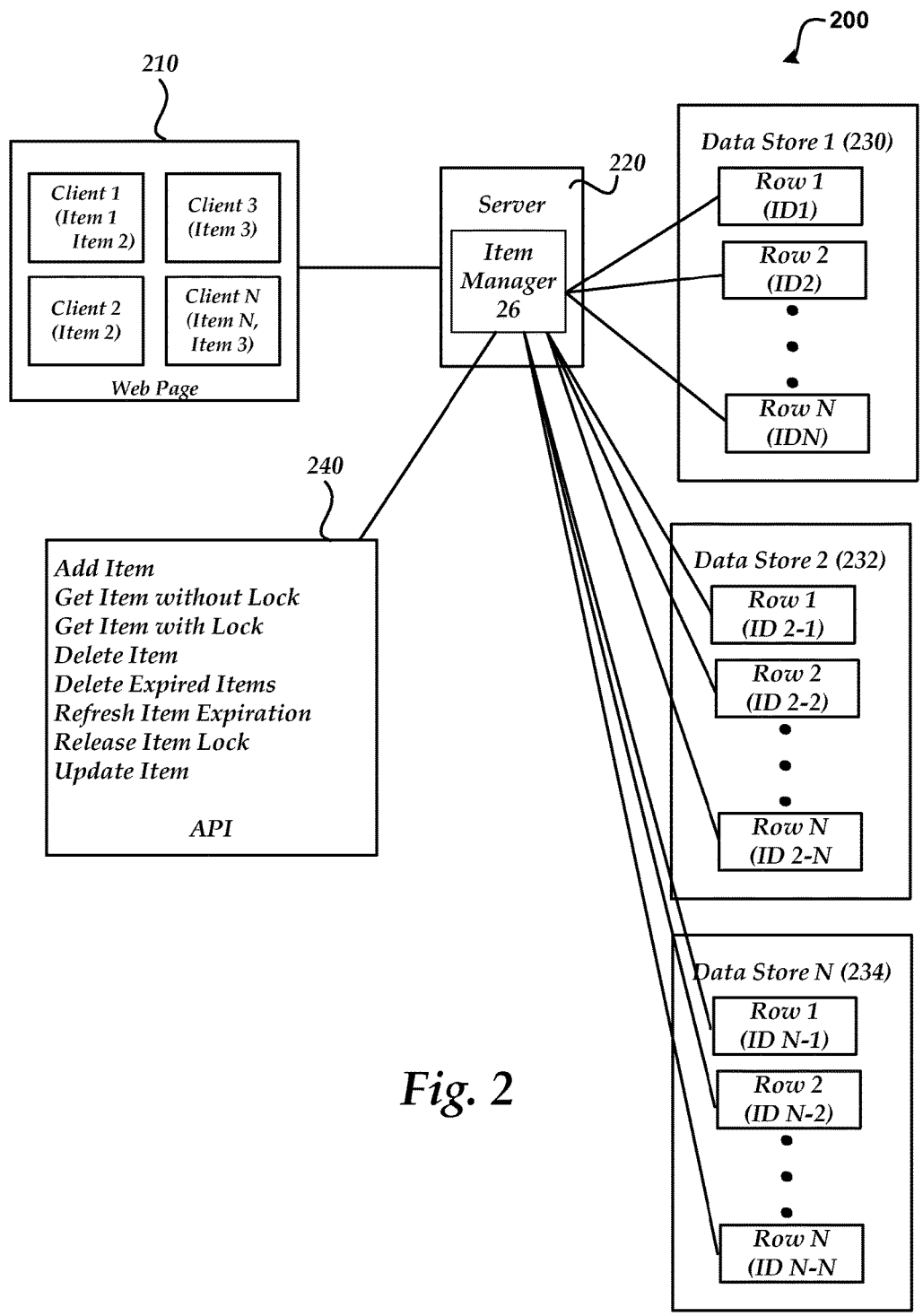
FIG. 2 shows a system having multiple clients that utilize a temporary service state protocol for independently managing and interacting with items temporarily stored in a data store.

FIG. 2 shows a system having multiple clients that utilize a temporary service state protocol for managing and independently interacting with items temporarily stored in a data store. As illustrated, system 200 includes web page 210 that is associated with multiple clients, such as clients 1-N. Each of the clients illustrated stores data temporarily in data store 230 and/or data store 232 between requests made to server 220. As briefly discussed above, item manager 26 is configured to provide a way for each client to interact with data that it has stored within an item within a row of a database (i.e. Rows 1-N), such as one or more of the items 1-N. As illustrated, client 1 is associated with Item 1 having an identifier of ID1; client 2 is associated with Item 2 having an identifier of ID2-2; client 3 is associated with Item 3 having an identifier of ID2-1; and client N is associated with two items (Item N having an identifier of IDN and Item 1).

Each item that is stored within a row of the database may be related to another item(s) (row(s)) within the same database and/or a different database that is stored on the same computing device or another computing device. For example, a parent item (i.e. a document) may include one or more child items that represents objects embedded within the document. As illustrated within web page 210, Item 1 is related to Item 2 and Item N is related to Item 3. Generally, when an item is related to another item, an action to an item also affects the related dependent item(s). For example, deleting a parent item (i.e. Item 1) deletes any children (i.e. Item 2) of that item. Different actions may be configured based on the application. For example, different actions may be configured based on a level of the relationship (i.e. parent to child, child to child, level to same level, level to another level, and the like).

Items for storing the temporary data may also be stored on one or more databases across one or more computing devices. Different allocation schemes may also be used. For example, each database may store an equal portion of the load, a non-equal portion of the load (i.e. 70% of load to data store 1, 30% to data store 2), each database may be associated with one or more applications, and the like. A user may configure the allocation schemes. Databases may also be added or paused on a live server. For instance, a database may be added during an existing session and/or data within items on one database may be migrated to another database.

Instead of each client receiving data that it is not interested in, each client utilizes API 240 to manage its own data that is to be temporarily stored. The procedures for API 240 that are associated with the temporary state service protocol are directed at allowing the clients to add items to the data store, modify data within the items, retrieve data from the items, and delete data from items in the data store. The clients may also use the API to place and remove virtual locks when accessing data within the items as well as modify expiration times of the items.

According to one embodiment, the procedures that are supported by API 240 include the following: an Add Item procedure; Get Item without Lock procedure; Get Item with Lock procedure; Delete Item procedure; Delete Expired Items procedure; Refresh Item Expiration procedure; Release Item Lock procedure; and an Update Item procedure.

The Add Item procedure is used by the clients to create a new item and row in data store 230 and insert data specified by the client calling the add item procedure into the item specified by the client into the data store.

The Get Item without Lock procedure retrieves data from the specified item in the data store without placing a virtual lock on the data. Placing a lock on an item in the data store prevents other clients from changing the data while the client that has placed the item in a lock interacts with the data. The Get Item without Lock procedure allows a client to view the data in the item but not modify the data.

The Get Item with Lock procedure retrieves data from the specified item the data store and attempts to place a virtual lock on the item for exclusive access by the requesting client. When the item is locked, only the client that placed the lock can modify the data.

The Delete Item procedure deletes an item of data from the data store. According to one embodiment, the Delete Item procedure deletes the item and any related items that are considered children of the item.

The Delete Expired Items procedure deletes the expired items of data from the data store. According to one embodiment, an item expires after a predetermined period of time such that storage is not tied up for longer then needed within data store 230. The timeout can be set to many different values. For example, the expiration period may be ten minutes, thirty minutes, one hour, twenty four hours, and the like. According to one embodiment, each client determines an expiration time for each item that it has created. For instance, one client on web page 210 may need data in item 1 for fifteen minutes whereas another client, or the same client, on the web page may need data in another item for twenty four hours. According to one embodiment, calling the delete expired items procedure removes all of the expired items from the data store regardless of the client that created the item. The delete expired items procedure may be called by a client and/or automatically called at predetermined times.

The Refresh Item Expiration procedure updates the expiration time of an item of data in the data store. For example, a client may need to store the data longer then it first calculated. According to one embodiment, the refresh period is the same as a first indicated expiration time. According to another embodiment, the refresh period may be set to a different expiration time period.

The Release Item Lock procedure removes a virtual lock from an item of data such that other clients can access the item if needed.

The Update Item procedure updates an item of data in the data store.

The following are exemplary signatures of the procedures.

PROCEDURE AddItem (@id varchar(512), @item varbinary(max), @timeout int); where @id: The procedure associates the data in the data store with the supplied identifier. @id is not NULL. Data associated with the same @id does not already exist in the data store. @item: The data that is to be stored. The procedure does not place a virtual lock on the stored data. @timeout: A positive integer value in minutes indicating the time-out of the data. Return Values: An integer which is 0.

PROCEDURE GetItemWithoutLock (@id varchar(512), @item varbinary(max) OUTPUT, @locked bit OUTPUT, @lockAgeInSeconds int OUTPUT, @lockCookie int OUTPUT,); where @id: The procedure attempts to retrieve data associated with the supplied identifier. @item: The value passed into the procedure in this parameter is ignored. If no data exists for the identifier supplied in the @id variable, a NULL value is returned. If the data identified by the @id variable does not have a virtual lock on it, the procedure returns the data in the @item output parameter. Otherwise a NULL value is returned in the @item output parameter. @locked: The value passed into the procedure in this parameter is ignored. If no data exists for the identifier supplied in the @id variable, a NULL value is returned. If the data identified by the @id variable does not have a virtual lock on it, a 0 is returned in the @locked output parameter. Otherwise a 1 is returned in the @locked output parameter. @lockAgeInSeconds: The value passed into the procedure in this parameter is ignored. If no data exists for the identifier supplied in the @id variable, a NULL value is returned. If the data identified by the @id variable does not have a virtual lock on it, the value returned in the @lockAgeInSeconds output parameter is 0. Otherwise @lockAgeInSeconds is not NULL, and the procedure returns the lock age in seconds of the data in the @lockAgeInSeconds output parameter. @lockCookie: The value passed into the procedure in this parameter is ignored. If no data exists for the identifier supplied in the @id variable, a NULL value is returned. If the data identified by the @id variable does not have a virtual lock on it, the value returned in the @lockCookie output parameter is ignored by the protocol client. Otherwise, the procedure returns the lock cookie currently associated with the virtual lock in the @lockCookie output parameter which is not NULL. Return Values: An integer which is 0.

PROCEDURE GetItemWithLock (@id varchar(512), @item varbinary(max) OUTPUT, @locked bit OUTPUT, @lockAgeInSeconds int OUTPUT, @lockCookie int OUTPUT); where @id: the procedure attempts to retrieve data associated with the supplied identifier. @item: the value passed into the procedure in this parameter is ignored. If no data exists for the identifier supplied in the @id variable, a NULL value is returned. If the data identified by the @id variable does not have a virtual lock on it, the procedure returns the data in the @item output parameter. Otherwise a NULL value is returned in the @item output parameter. @locked: The value passed into the procedure in this parameter is ignored. If no data exists for the identifier supplied in the @id variable, a NULL value is returned. If the data identified by the @id variable does not have a virtual lock on it, the value 0 is returned in the @locked output parameter, and the procedure places a virtual lock on the data. Otherwise, the value 1 is returned in the @locked output parameter. @lockAgeInSeconds: The value passed into the procedure in this parameter is ignored. If no data exists for the identifier supplied in the @id variable, a NULL value is returned. If the data identified by the @id variable does not have a virtual lock on it, the value returned in the @lockAgeInSeconds output parameter is 0. Otherwise, the procedure returns the lock age in seconds of the data's virtual lock in the @lockAgeInSeconds output parameter which is not NULL. @lockCookie: The value passed into the procedure in this parameter is ignored. If no data exists for the identifier supplied in the @id variable, a NULL value is returned. Otherwise, the procedure returns the lock cookie associated with the virtual lock in the @lockCookie output parameter which is not NULL. Return Values: An integer which is 0.

PROCEDURE DeleteExpiredItems( ) attempts to delete all of the expired items in the data store; Return Values: An integer which is 0.

PROCEDURE DeleteItem (@id varchar(512), @lockCookie int,); deletes a specified item within the data store where @id: The identifier of data to remove. @lockCookie: The lock cookie of the data to remove. Return Values: An integer which is 0.

PROCEDURE RefreshItemExpiration (@id varchar (512),); where @id: The procedure updates the expiration time of the data associated with the supplied identifier. If no data exists for the identifier supplied in the @id variable, the procedure does not make any changes. Return Values: An integer which is 0.

PROCEDURE ReleaseItemLock (@id varchar(512), @lockCookie int,); where @id: The procedure removes the virtual lock from the data associated with the supplied identifier. If no data exists for the identifier supplied in the @id variable, the procedure does not make any changes. @lockCookie: If the value supplied in this parameter matches the lock cookie currently associated with the instance of data, the procedure removes the virtual lock from the data, and it updates the expiration time of the data. Otherwise, the procedure does not remove the virtual lock and does update the expiration time. Return Values: An integer which is 0.

PROCEDURE UpdateItem (@id varchar(512), @item varbinary(max), @timeout int, @lockCookie int,); where @id: The procedure updates the data in the data store associated with the supplied identifier. If no data exists for the identifier supplied in the @id variable, the procedure does not make any changes. @item: The new data that is to be stored if the lock cookie supplied in the @lockCookie parameter matches the lock cookie currently associated with the instance of data. Additionally, the procedure does not remove the virtual lock from the data. @timeout: A value in minutes indicating the lifetime of the supplied data. If the lock cookie supplied in the @lockCookie parameter matches the lock cookie currently associated with the item of data, the procedure updates the expiration time associated with the instance of data. @lockCookie: The procedure updates the data in the data store if the lock cookie supplied in the @lockCookie parameter matches the lock cookie currently associated with the instance of data. If this parameter does not match the lock cookie currently associated with the instance of data, the procedure does not make any changes. Return Values: An integer which is 0.

Figure 3:
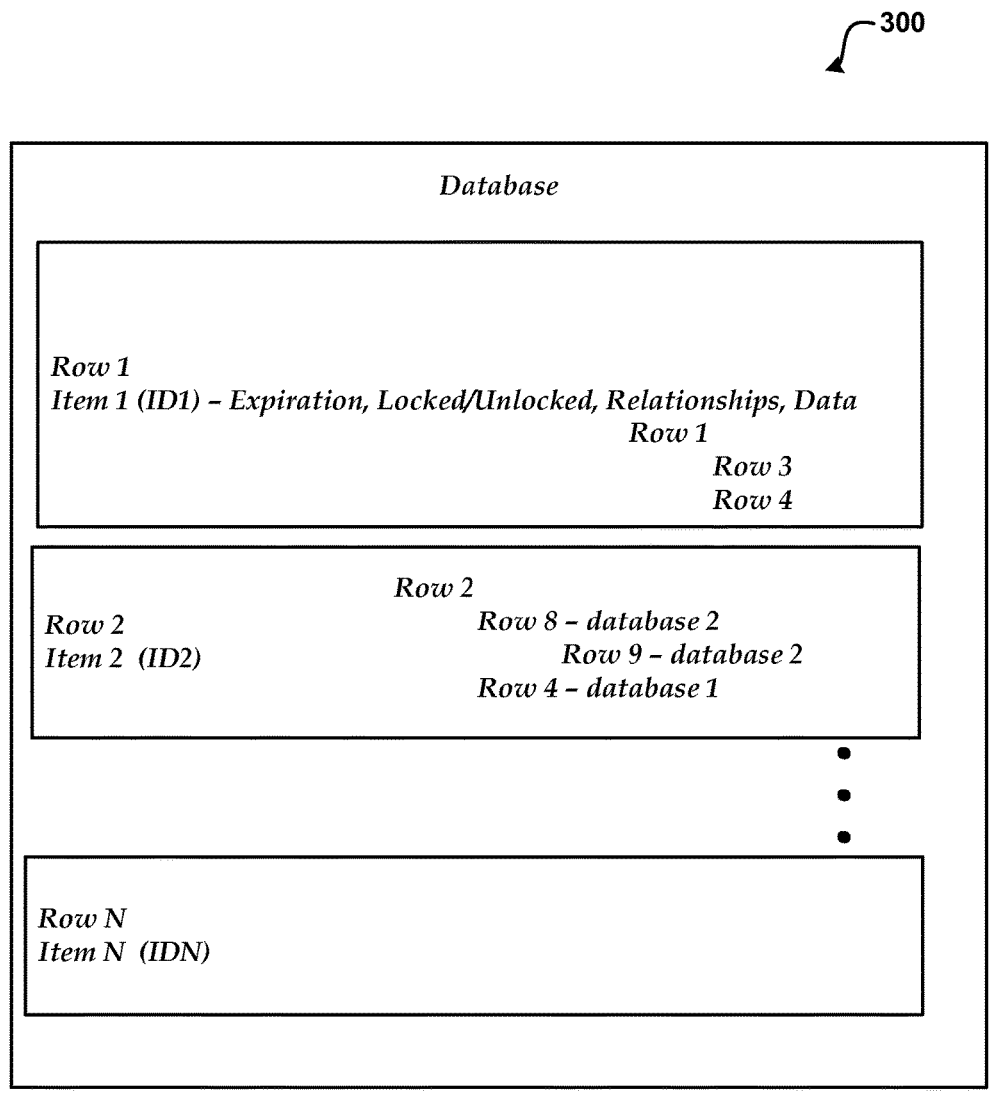
FIG. 3 shows an example database having N items that are stored in N rows of the database.

FIG. 3 shows an example database 300 having N items that are stored in N rows of the database. Each row within the database is associated with a different item that is managed by a client. According to one embodiment, each item is identified by a unique identifier and includes information relating to the management of the item such as: an expiration time for the data, whether the data is locked/unlocked, any relationships for the row, and the data itself. Other data relating to the item may also be stored within the row of the database. As illustrated, Row 1 specifies that Row 3 and Row 4 are children to Row 1. Row 2 specifies that Row 8 is a child of Row 2 that is stored in a different database (database 2), Row 9 is a child of Row 8 (also stored in database 2) and Row 4 is a child of Row 2 that is stored in the same database as Row 2.

Figure 4:
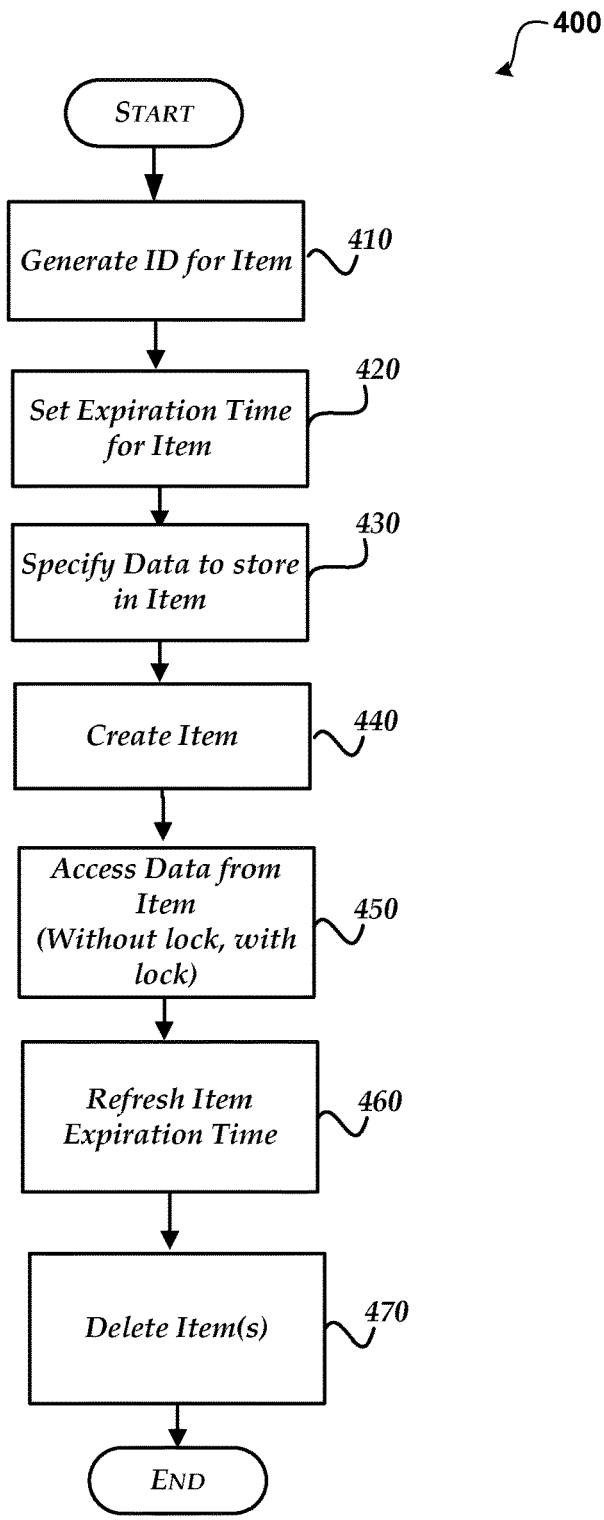
FIG. 4 shows an illustrative process for using the temporary service state protocol to store data within rows of a database.

Referring now to FIG. 4 an illustrative process for using the temporary service state protocol to store data within rows of a database will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

Referring now to FIG. 4, after a start operation, the process flows to operation 410, where an identifier for a new item to be created is determined. The identifier may be created by the client or on a different computing device. According to one embodiment, the client asks the API to generate the unique identifier for the item and uses the identifier when creating the item. The identifier uniquely identifies the item within one of the rows across different databases. For example, each row of one or more databases that stores an item is assigned a unique identifier.

Moving to operation 420, an expiration time for the item is specified. The expiration time specifies a time period that is used to determine how long the item is to be maintained in a row of the data store. According to one embodiment, the client creating the item specifies a timeout value from which the expiration time is calculated. Each item may have a different expiration time. For example, one item may expire after ten minutes whereas another item expires after two hours. According to one embodiment, any related items are set to the same expiration time.

Moving to operation 430, the data to store in the item is specified. The data may be any type of data that is to be temporarily stored.

Transitioning to operation 440, the data specified by the client is stored within a row of a database that is identified by the ID for the item. According to one embodiment, the items may be distributed across different databases that use an allocation scheme that specifies how to store the items. For example, one database may store 10% of the items whereas another database may store 55% and a third database may store 35% of the item. As discussed above, any allocation scheme may be used.

Moving to operation 450, a client requests to access the data based on the unique identifier. A client may read the data and/or update the data. According to one embodiment, a client may access the data with a lock such that the while the lock is in place, the client is the only client that is authorized to update the data within the item. The client may also access the data without a lock in which case the client is authorized to read the data but not make any updates to the data. Different clients may also collaborate on the same data within an item within a row of the database when each of the collaborating clients are provided with the unique identifier of the row of the database. This may allow multiple users to collaborate on the same shared data, allow multiple browsers or applications on a user's desktop to collaborate on the same data, and the like.

Flowing to operation 460, a client may refresh the expiration time of an item. For example, a client may want to store the data in the item for a longer period of time then was initially set. According to one embodiment, when a parent item is refreshed, any children items of the item are also refreshed. The expiration time may be set to last longer then a web session. For example, the temporary state data may be stored longer then a current user's web session. In this way, the data that is associated with each of the clients in a previous web session may be used in a new web session as long as the data has not expired.

Moving to operation 470, a client may use the API to delete a single item within the data store and/or delete every expired item within the data store. According to one embodiment, when a parent item is deleted, any children items of the item are also deleted.

The process then moves to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for temporarily storing and accessing data in a data store, the system comprising:
   a memory; and
   a processing unit coupled to the memory, wherein the processing unit is operative to:
      provide, by a temporary state service protocol of a server, an application programming interface (API) associated with a web page, wherein the web page comprises one or more objects representing data associated with the web page, wherein the data is stored in one or more items, wherein the one or more items are each identified by a unique identifier, and associated with an expiration time specifying the amount of time the respective one or more items are to be maintained;
      receive, by the API, a first request from a first client associated with the web page, wherein the first request is associated with a web session, wherein the expiration time is configured to extend beyond the web session, and wherein the first client manages the data stored in an item of the one or more items independently from other clients associated with the web page using the temporary state service protocol and a respective unique identifier;
      present at least a portion of the data stored in the item to the first client using the API;
      receive a second request from a second client, wherein the second request comprises the respective unique identifier, and wherein the second client is different from the first client; and
      use the respective unique identifier in the second request to enable the second client to access the item managed by the first client.

2. The system of claim 1, wherein the item is stored within a row of a database.

3. The system of claim 2, further comprising:
   determining the row of the database that is associated with the item; and
   displaying the data stored within the item associated with the row.

4. The system of claim 2, wherein the respective unique identifier identifies the item within the row of the database.

5. The system of claim 2, wherein the other clients are allowed to collaborate on the data temporarily stored within the item using the respective unique identifier.

6. The system of claim 2, wherein the item is related to one or more items within another row of at least one other database hosted on a different computing device, whereby an action to the item affects the related one or more items.

7. The system of claim 2, wherein the data stored within the row is stored beyond a session of the web page.

8. The system of claim 1, wherein the expiration time is created using a timeout value specified by the first client.

9. The system of claim 1, wherein the item managed by the first client is accessed concurrently by the first client and the second client.

10. The system of claim 1, wherein, when the second client is accessing the item managed by the first client, the item managed by the first client is inaccessible to the first client.

11. The system of claim 1, deleting the item managed by the first client cause child items of the item managed by the first client to be deleted.

12. A computer-implemented method for temporarily storing and accessing data, the method comprising:
   providing, by a temporary state service protocol of a server, an API associated with a web page, wherein the web page comprises one or more objects representing data associated with the web page, wherein the data is stored in one or more items, wherein the one or more items are each identified by a unique identifier and associated with an expiration time specifying the amount of time the respective one or more items are to be maintained in a database;
   receiving, by the API, a first request from a first client associated with the web page, wherein the first request is associated with a web session, wherein the expiration time is configured to extend beyond the web session, and wherein the first client manages the data stored in an item of the one or more items independently from other clients associated with the web page using the temporary state service protocol and a respective unique identifier;
   presenting at least a portion of the data stored in the item to the first client using the API;
   receiving a second request from a second client, wherein the second request comprises the respective unique identifier, and wherein the second client is different from the first client; and
   using the respective unique identifier in the second request to enable the second client to access the item managed by the first client.

13. The method of claim 12, wherein the item represents one or more objects on the web page, and wherein the item is stored within a row of the database.

14. The method of claim 13, further comprising:
   determining the row of the database that is associated with the item; and
   displaying the data stored within the item associated with the row.

15. The method of claim 13, wherein the respective unique identifier identifies the item within the row of the database.

16. The method of claim 13, wherein the other clients are allowed to collaborate on the data temporarily stored within the item using the respective unique identifier.

17. The method of claim 13, wherein the item is related to one or more items within another row of at least one other database hosted on a different computing device, whereby an action to the item affects the related one or more items.

18. The method of claim 13, wherein the data stored within the row is stored beyond a session of the web page.

19. A computer-readable storage device having computer-executable instructions which when executed performs a method for storing and accessing data, the method comprising:

providing, by a temporary state service protocol of a server, an API associated with a web page, wherein the web page comprises one or more objects representing data associated with the web page, wherein the data is stored in one or more items, wherein the one or more items are each identified by a unique identifier, and associated with an expiration time specifying the amount of time the respective one or more items are to be maintained;

receiving, by the API, a first request from a first client associated with the web page, wherein the first request is associated with a web session, wherein the expiration time is configured to extend beyond the web session, and wherein the first client manages the data stored in an item of the one or more items independently from other clients associated with the web page using the temporary state service protocol and a respective unique identifier;

presenting at least a portion of the data stored in the item to the first client using the API;

receiving a second request from a second client, wherein the second request comprises the respective unique identifier, and wherein the second client is different from the first client; and using the respective unique identifier in the second request to enable the second client to access the item managed by the first client.

20. The computer-readable storage device of claim 19, wherein the item represents one or more objects on the web page, and wherein the item is stored within a row of a database.

* * * * *